United States Patent [19]
Derner

[11] 4,147,069
[45] Apr. 3, 1979

[54] GEARED BELT FOR POSITIVE DRIVE TRANSMISSION

[75] Inventor: William J. Derner, Indianapolis, Ind.

[73] Assignee: FMC Corporation, San Jose, Calif.

[21] Appl. No.: 728,802

[22] Filed: Oct. 1, 1976

[51] Int. Cl.² .............................................. F16G 1/00
[52] U.S. Cl. ................................................... 74/231 C
[58] Field of Search ..................... 74/229, 234, 231 M

[56] References Cited

U.S. PATENT DOCUMENTS

| 642,549 | 1/1900 | Kennedy | 74/234 |
| 2,971,392 | 2/1961 | Case | 74/231 M |
| 2,988,925 | 6/1961 | Sauer | 74/229 |
| 3,002,396 | 10/1961 | Worrall, Jr. | 74/229 |

FOREIGN PATENT DOCUMENTS

| 601412 | 1/1960 | Italy | 74/229 |
| 637354 | 5/1950 | United Kingdom | 74/231 M |

Primary Examiner—Benjamin W. Wyche
Assistant Examiner—Wesley S. Ratliff, Jr.
Attorney, Agent, or Firm—J. W. Edwards; J. F. Verhoeven

[57] ABSTRACT

A geared belt provides for the positive transmission of motion between the belt and a sprocket. The belt has inwardly projecting gear teeth, with tooth faces that are contacted by sprocket teeth, and thin flexible portions bridging the space between successive gear teeth, with inwardly facing surfaces that define a dedendum line of the belt gear teeth. The belt gear teeth are substantially stiffer than the flexible portions between teeth. When the belt is in engagement with the sprocket and when transmitting motion therebetween, the belt is subjected to tension stress. The belt is also subjected to bending stresses that are induced by contact between teeth of both the belt and the sprocket upon entering or leaving meshing engagement. The belt is shaped along transverse sections, at the junctures of the tooth faces and the dedendum lines, with the neutral zones of the transverse sections being offset perpendicularly from the line of belt tension. Thus, belt tension induces flexural stresses within the transverse sections that counteract the bending stresses induced within the transverse sections by contact between the belt gear teeth and the sprocket teeth when entering or leaving meshing engagement. The belt can be formed by welding or bonding the relatively stiff teeth to a pre-shaped flexible band, or the teeth can be formed integrally with the bend by a broaching process or a molding process. The teeth can be split transversely to provide flexibility for softening tooth contacts.

5 Claims, 6 Drawing Figures

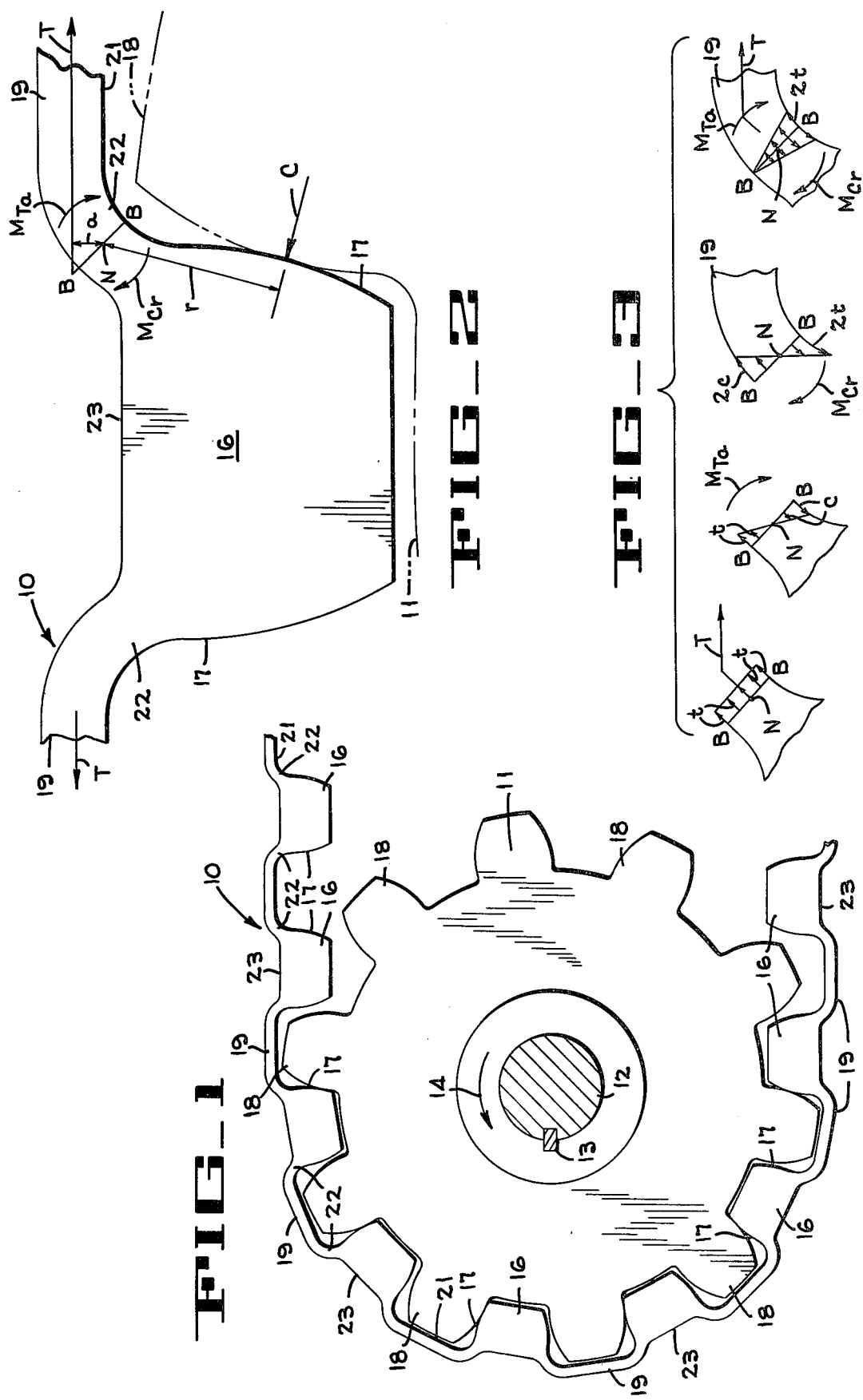

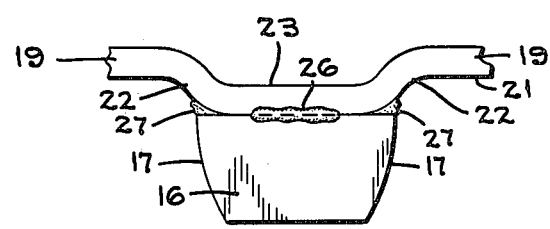
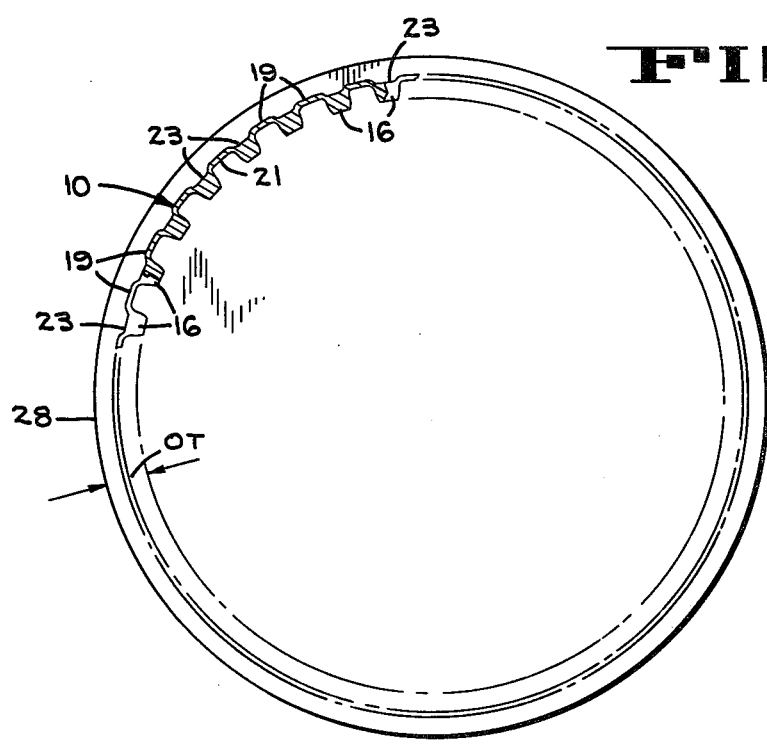
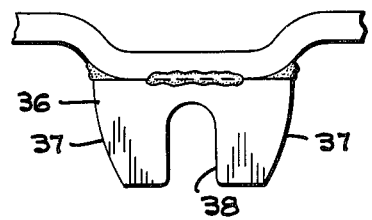

GEARED BELT FOR POSITIVE DRIVE TRANSMISSION

BACKGROUND OF THE INVENTION

1. Field of the Invention

This invention relates to a class of machine elements and mechanisms that include gearing for the transmission of motion between a belt and a sprocket. More specifically, this invention pertains to a geared belt for the positive transmission of motion between the belt and a sprocket.

2. Description of the Prior Art

A non-articulated, geared, metal belt is disclosed by U.S. Pat. No. 2,971,392. This belt is formed by a continuous, load carrying, metal band with inflexible teeth in repeating spaced apart relationship and thin flexible portions bridging the space between successive teeth. At the junctures between the side faces of the teeth and the relatively thin sections between teeth are fillets of metal that provide a variable stiffness between the inflexible teeth and the thin flexible sections. These fillets increase the resistance to sharp bends in the metal band. Such bending is likely to produce permanent deformations or strains in the metal.

U.S. Pat. No. 3,636,788 teaches prestressing the links of a drive chain, at a crotch region between the inside flanks of the teeth, to provide a favorable residual compressive stress and thereby increase fatigue resistance. This prestressing is induced by a cold-forming operation. U.S. Pat. No. 239,114 shows metallic belting that has been bent to provide concave grooves or channels, extending transversely across the outer surface of the belting, and to present convex projections or arch shaped teeth upon the inner surface of the belting. These teeth engage grooves or furrows in the faces of pulleys. Such belting is used for applications where the work to be performed is very light, because tension in the belting would tend to straighten out the concave channels and reduce the projection of the arch shaped teeth. U.S. Pat. No. 2,711,815 shows belting with transverse crimps or corrugations that provide for expansion and contraction of the belting to withstand a wide range of temperature variation.

SUMMARY OF THE INVENTION

A geared belt provides for the positive transmission of motion between the belt and a sprocket. The belt has inwardly projecting gear teeth that mesh with teeth projecting outwardly from the sprocket. Contact between these teeth, upon entering or leaving meshing engagement, causes the application of bending moment to thin flexible portions of the belt bridging the space between successive gear teeth. The internal stresses induced thereby are combined with tension stresses in the belt, and these combined stresses can become excessive, particularly at the extreme fibers of the section. To avoid excessive stress at the extreme fibers on a transverse section of the belt that is located at the junctures of the tooth faces and the dedendum lines of the belt gear teeth, the belt is shaped so that the neutral zones of these transverse sections are offset perpendicularly towards the belt gear teeth from the line of belt tension. Thus, the belt tension induces flexural stresses within these transverse belt sections that counteract the bending stresses induced by tooth contact.

In a preferred embodiment of the invention, fillets are provided at the junctures of the belt gear tooth faces and the dedendum line. The flexible portions of the belt at the fillets are curved inwardly towards the belt gear teeth. The outer longitudinal surface of the belt, that is located opposite each gear tooth and the fillets adjacent thereto, is curved inwardly towards the tooth. Thus, these surfaces are offset inwardly towards the belt gear tooth from the adjacent longitudinal surfaces of the flexible portions of the belt. The belt gear teeth can have faces with profiles of involute form. Such teeth can be formed integrally with the endless band or welded thereto. As a further modification, the teeth can be split transversely to provide some flexibility within each gear tooth itself.

BRIEF DESCRIPTION OF THE DRAWING

FIG. 1 is an elevational view of a portion of a geared belt embodying the present invention, and this geared belt portion is trained about a sprocket.

FIG. 2 is an enlarged detail view of a geared belt tooth with a contacting sprocket tooth shown in phantom line.

FIG. 3 is a schematic view illustrating various internal stresses on belt transverse sections that are located at the junctures of the tooth faces and the dedendum lines. These stresses are induced by tension on the belt and by bending moment thereon resulting from contact between teeth of the belt and the sprocket.

FIG. 4 illustrates a method of making the belt, from a flexible band with pre-shaped corrugations therein, by welding tooth portions to corrugated portions of the band.

FIG. 5 illustrates a method of making the geared belt from a tube by a broaching process.

FIG. 6 illustrates a modified form of belt gear teeth, wherein the teeth are split transversely of the band, to provide tooth flexibility for softening contact between the teeth of the belt and the sprocket.

DESCRIPTION OF THE PREFERRED EMBODIMENTS

With reference to FIG. 1, a portion of a geared belt 10 is trained about a sprocket 11. This sprocket is mounted upon a drive shaft 12, and a key 13 interlocks the sprocket for rotation with the drive shaft. Such rotation is represented by the arrow 14. The geared belt, shown in FIG. 5 as an endless band, is trained about two or more sprockets 11, as would be indicated in FIG. 1 by adding a symmetrical belt portion and sprocket at a location opposite to where the belt is broken, for the positive transmission of motion from one sprocket to another.

The geared belt 10 has gear teeth 16, projecting inwardly from the belt, with tooth faces 17 that are contacted by sprocket teeth 18. Preferably, both the belt gear teeth and the sprocket teeth have modified profiles, as do the teeth of spur gears or helical gears, to facilitate entering and leaving meshing engagement. The tooth faces can have an involute shape, with a pressure angle of about 20 degrees for the full tooth depth, and the tooth width can be reduced to provide clearance. The belt also has thin flexible portions 19, that bridge the space between successive gear teeth. Fillets 22 are provided at the junctures of the belt gear tooth faces and the dedendum line or surfaces 21. These fillets are curved as to be tangent to both the tooth face and the dedendum line or surface. The belts outer longitudinal surface has indented portions 23 that are located opposite each gear tooth and the fillets adjacent thereto.

These indented portions are offset inwardly towards the belt gear tooth from the adjacent surfaces of the flexible portions of the belt. Thus, the outer longitudinal surfaces of the flexible portions of the belt curve inwardly at the fillets towards the belt gear teeth.

Since the belt gear teeth 16 are much thicker and stiffer than the thin flexible portions 19, the flexible portions of the belt bend readily to accommodate movement of the belt gear teeth, upon entering or leaving meshing engagement with the sprocket teeth. The gear teeth rigidly interconnect the thin flexible portions. The thin flexible portions of the belt are also subjected to tension stress when the belt 10 is trained about sprockets 11 and when the belt transmits motion from one sprocket to another. The combined stresses of belt tension and bending can become excessive, but the belt 10 is shaped to avoid such excessive stress at the fillets 22, and will now be described.

Looking at FIG. 2, forces representing tension "T" are applied to the belt gear tooth 16 along the neutral zone or centroidal plane at the middle of the flexible portions 19, and a line interconnecting these zones or planes between each gear tooth corresponds to the pitch line of the belt or the line of belt tension. Offset perpendicularly from the line of tension force "T" by a distance "a" is a neutral zone N of a transverse section B—B that bisects the included angle at the fillet 22 between the tooth face 17 and the dedendum line or surface 21. Thus, the belt tension T applies a bending moment $M_{Ta}$ about the neutral zone of the section B—B. Sprocket tooth 18 applies a force "C" to the belt gear tooth along a line of force, and offset perpendicularly from the line of force by a distance "r" is the neutral zone of the transverse section B—B. Thus, the force C applies a bending moment $M_{cr}$ about the neutral zone of the section B—B.

The internal stresses developed on the section B—B as a result of the belt tension T and the tooth contact C are illustrated in FIG. 3. Looking from left to right, the belt tension T produces a uniform tension stress "t" on the section B—B. The moment $M_{Ta}$ produces flexure resulting in a tension stress "t" in the extreme fibers at the outer surface of the section and a compression stress "c" in the extreme fibers at the inner surface of the section. The moment $M_{cr}$ produces bending stresses that include compression "2c" in the extreme fibers at the outer surface of the section and tension "2t" in the extreme fibers at the inner surface of the section. The stresses produced by the moment $M_{Ta}$ tend to counteract the stresses produced by the moment $M_{cr}$. It will be understood that the actual amount of stress depends upon the magnitude of both belt tension T and force C and the dimensional details of both geared belt 10 and sprocket 11. However, assuming that the magnitude of tension "t" is equal to the magnitude of compression "c" and that the stresses produced by the moment $M_{cr}$ are twice as large as the stresses produced by the moment $M_{Ta}$, then the combined stresses for the belt tension T, moment $M_{Ta}$, and moment $M_{cr}$ produce no stress at the outer surface of the section B—B and a tension of $2t$ at the inner surface of the section.

The configuration of the fillets 22, the indented portions 23, the tooth faces 17 and the flexible portions 19, can be varied from those shown in FIG. 2, in order to limit within an acceptable range the combined internal stresses at the extreme fibers of the section B—B, as shown in FIG. 3, and of corresponding transverse sections adjacent thereto. For known magnitudes of belt tension T and tooth contact C, the configuration of the belt can be varied to provide desired distances "a" and "r" and to provide a desired thickness of the transverse section B—B, for limiting the extreme fiber stress on the section to an acceptable range.

The geared belt 10 can be made from an endless steel band that has been pre-shaped with corrugations defining the fillets 22 and the indented portions 23, as shown in FIG. 4. Individual metallic teeth 16 are welded to the inner surface of the band that is opposite from the indented portions and adjacent to the fillets. A weld 26, that joins the root of tooth 16 to the band, can be made by a resistance type of welding, such as projection welding. Suitable fillet welds 27 can be made to unite the tooth faces 17 with the fillets 22.

Another way of making the geared belt 10 is illustrated in FIG. 5. A tube 28, having an original thickness OT, is cut internally by a broaching process, to form the gear teeth 16 and the inwardly facing surfaces 21, while the external surface of the tube is machined to define the outer surfaces of the flexible portions 19, and a broaching process is used to form the indented portions 23. In this manner, the teeth and the flexible portions are formed integrally. In addition to the foregoing methods of forming the geared belt from steel, the belt could also be made of molded plastic or rubber.

A modified form of gear tooth 36 is shown in FIG. 6. This tooth could be welded to an endless steel band in the same manner as was the tooth 16 that is shown in FIG. 4. However, tooth 36 is split transversely by a groove 38 to provide some flexibility for softening tooth contact. The tooth 36 rigidly interconnects the thin flexible portions of the belt so that there is no expansion or contraction of the belt at the tooth. When a sprocket tooth contacts one of the tooth faces 37, there is a tendency for that tooth face to deflect towards the opposite tooth face 37 and thereby soften the tooth contact.

From the foregoing description it will be seen that the disclosed geared belt is shaped so that belt tension induces, within critical belt sections, flexural stresses that counteract the bending stresses induced by tooth contact. The belt gear teeth can have faces with profiles of involute form, and such teeth can be formed integrally with an endless band or welded thereto. The teeth can be split transversely to provide some flexibility within the tooth itself to soften the contact with a sprocket tooth.

Although the best mode contemplated for carrying out the present invention has been herein shown and described, it will be apparent that modification and variation may be made without departing from what is regarded to be the subject matter of the invention.

What is claimed is:

1. A geared belt for the positive transmission of motion between the belt and a toothed sprocket, said belt comprising, thick, solid and substantially rigid gear teeth projecting from one side of the belt in repeating spaced apart relationship having lateral tooth faces to be contacted by sprocket teeth, successive thin flexible portions bridging the spaces between successive gear teeth and connected thereto with longitudinally extending surfaces of the flexible portions on the gear teeth side of the belt defining a dedendum line of the belt gear teeth, said teeth being substantially stiffer than the thin flexible portions therebetween, said belt forming a continuous non-articulated band that is subjected to tension stress when in engagement with the sprocket and when transmitting motion to or from the sprocket, said belt being subjected to bending stresses that are induced by contact between the belt gear teeth and the sprocket teeth when entering or leaving meshing engagement, said belt being crimped to curve transversely at the junctures between the stiff teeth and the thin flexible portions therebetween with said dedendum line longitudinal surfaces on said one side of the belt merging toward and into said tooth faces in a concave fillet, and the surfaces of said flexible portions on the other side of said belt convexly curving toward said teeth thereby to define indented portions of said belt at said teeth and to offset the other side of said belt and said teeth laterally from the flexible portions so that belt tension induces within the crimped portions of the belt flexural stresses that counteract bending stresses induced therein by contact between the belt gear teeth and the sprocket teeth when entering or leaving meshing engagement.

2. A geared belt as described in claim 1 wherein the belt gear teeth have faces with profiles of involute form.

3. A geared belt as described in claim 1 wherein the belt gear teeth are split transversely to provide for some flexibility within each gear tooth itself.

4. A geared belt as described in claim 1 wherein the belt gear teeth are welded to an endless band.

5. A geared belt as described in claim 1 wherein the belt gear teeth are formed integrally with the endless band.

* * * * *